United States Patent [19]
Grave

[11] Patent Number: 6,043,855
[45] Date of Patent: Mar. 28, 2000

[54] LIQUID CRYSTAL DISPLAY HAVING A LOW PROFILE SURFACE MOUNT SWITCH

[75] Inventor: Duane A. Grave, Marion, Iowa

[73] Assignee: Rockwell Science Center, Inc., Thousand Oaks, Calif.

[21] Appl. No.: 09/052,537

[22] Filed: Mar. 31, 1998

[51] Int. Cl.[7] .................................................. G02F 1/1333
[52] U.S. Cl. ............................................................ 349/58
[58] Field of Search .............................. 349/58; 345/184; 348/825, 836, 837, 838; 248/917

[56] References Cited

U.S. PATENT DOCUMENTS

| | | | |
|---|---|---|---|
| 5,627,531 | 5/1997 | Posso et al. | 341/22 |
| 5,745,378 | 4/1998 | Barker et al. | 364/510 |
| 5,870,035 | 2/1999 | Bjernulf | 341/35 |

*Primary Examiner*—William L. Sikes
*Assistant Examiner*—James A. Dudek
*Attorney, Agent, or Firm*—Kyle Eppele; James P. O'Shaughnessy

[57] ABSTRACT

Disclosed is an avionics display device adapted for insertion into an avionics panel of an aircraft. The avionics display device includes a liquid crystal display having a liquid crystal display element and a bezel surrounding the liquid crystal display element. The avionics display device also includes a low profile rotary switch mounted on the bezel of the liquid crystal display to save avionics panel space in the aircraft. The low profile rotary switch includes a printed circuit board positioned beneath the bezel and having a plurality of electrical pads formed thereon. The switch also includes a contact member positioned adjacent the printed circuit board and having a first contact formed thereon. Rotation of the contact member causes the first contact to be electrically coupled to one of the plurality of electrical pads formed on the printed circuit board. A knob is coupled to the contact member such that rotation of the knob causes rotation of the contact member. The detent mechanism of the switch is positioned in the knob to lower the profile of the switch.

16 Claims, 4 Drawing Sheets

LIQUID CRYSTAL DISPLAY HAVING A LOW PROFILE SURFACE MOUNT SWITCH

FIELD OF THE INVENTION

The present invention relates generally to aviation electronics (avionics). More particularly, the present invention relates to a liquid crystal display (LCD) having a low profile surface mount switch and knob mounted on a bezel of the LCD to reduce the total cockpit surface area required for the display and switch combination.

BACKGROUND OF THE INVENTION

LCDs are frequently a preferred type of display for use in cockpits of aircraft. However, with very limited instrument panel area typically available, it is difficult to fit LCDs in aircraft having smaller cockpits. Rotatable knob type switches are frequently preferred by pilots over other types of switches and controls for use in controlling the information displayed by the LCD. The knob type switches are typically placed on the avionics panel on the top, bottom or sides of the LCD bezel.

In general, the thickness of switch panels is often determined by the thickness of a function select switch or potentiometer. The thickness required for conventional switch designs does not allow the switch and its associated printed circuit board (PCB) to be placed on the bezel directly surrounding the LCD glass. Consequently, the rotatable knob type switches must be placed on the avionics panel beside the LCD bezel, consuming even more avionics panel space and further limiting the use of LCDs in some aircraft.

SUMMARY OF THE INVENTION

Disclosed is an avionics display device adapted for insertion into an avionics panel of an aircraft. The avionics display device includes a liquid crystal display having a liquid crystal display element and a bezel surrounding the liquid crystal display element. The avionics display device also includes a low profile rotary switch mounted on the bezel of the liquid crystal display to save avionics panel space in the aircraft. The low profile rotary switch includes a printed circuit board positioned beneath the bezel and having a plurality of electrical pads formed thereon. The switch also includes a contact member positioned adjacent the printed circuit board and having a first contact formed thereon. Rotation of the contact member causes the first contact to be electrically coupled to one of the plurality of electrical pads formed on the printed circuit board. A knob is coupled to the contact member such that rotation of the knob causes rotation of the contact member. The detent mechanism of the switch is positioned in the knob to lower the profile of the switch.

DETAILED DESCRIPTION OF THE PREFERRED EMBODIMENTS

The present invention includes a low profile surface mount switch and knob for use with avionics liquid crystal displays (LCDs) which overcome the disadvantages associated with the thickness requirements of conventional avionics cockpit switching mechanisms. The present invention provides a solution to the problems associated with the thickness of conventional switching mechanisms by putting the mechanical detent into the knob of the switch, and having a contact rotate on the top surface of the printed circuit board (PCB) located below a bezel of the LCD. The resulting reduction in thickness allows the rotatable knob type switch to be positioned on the bezel of an LCD, thereby minimizing avionics panel space required for the LCD and rotatable switch combination.

Figure 1:
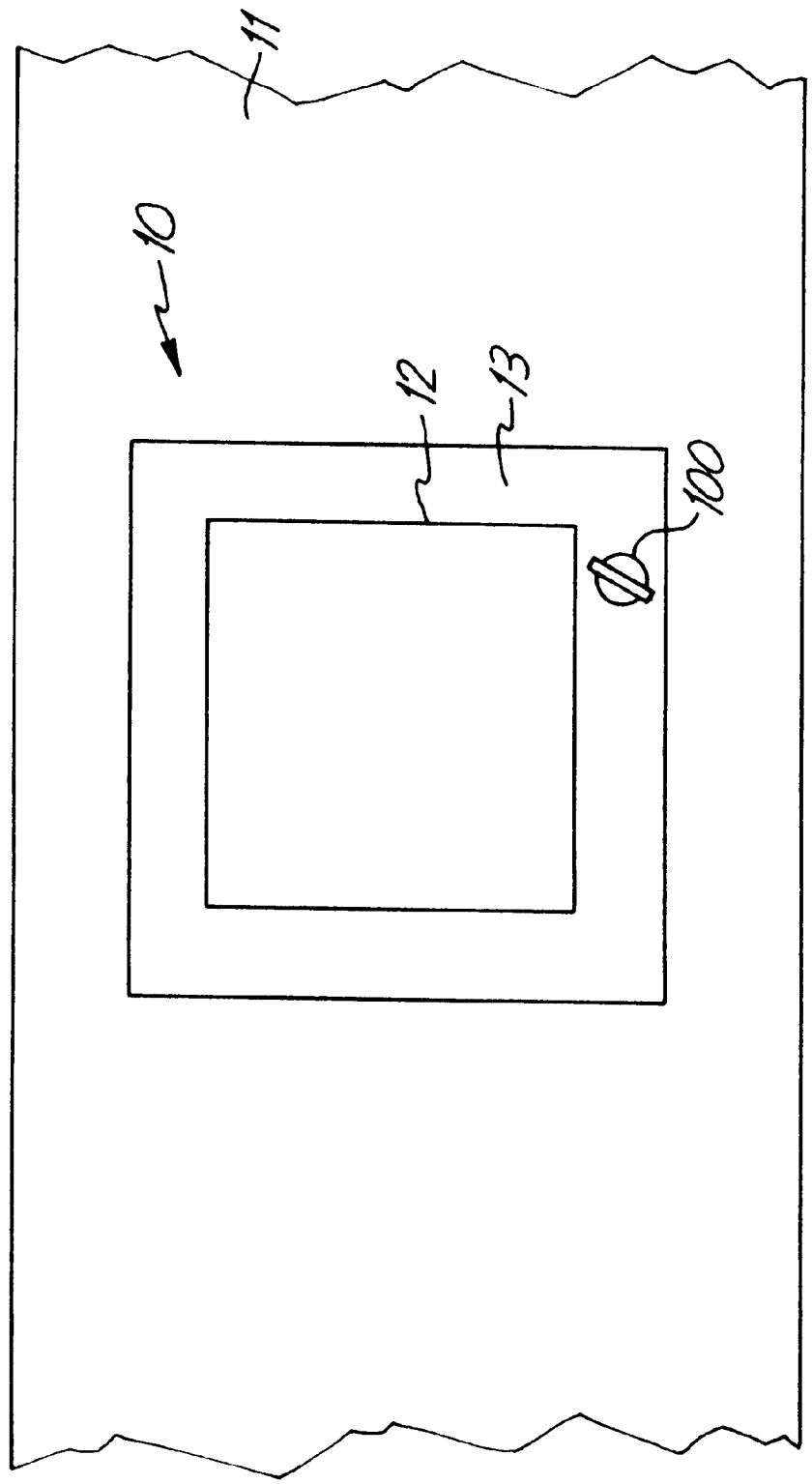
FIG. 1 is a diagrammatic front view of an LCD having a rotatable knob type switch positioned on the LCD bezel to minimize space required in an aircraft cockpit.

FIG. 1 is a diagrammatic illustration of a portion of avionics panel 11 of the type found in many aircraft. Avionics panel 11 has avionics display device 10 mounted therein for use by pilots of the aircraft. Avionics device 10 includes LCD portion 12 (generically referred to as the "display glass") surrounded by bezel or panel 13 as is known in the art. LCD portion and bezel 13 are coupled together to form a line replaceable unit. A low profile rotatable knob type switch 100 is mounted on bezel 13 for use in controlling LCD 12 or other avionics equipment. By using the low profile knob type switch 100, switch 100 can be placed on bezel 13 instead of on panel 11. This saves space on panel 13, allowing avionics display device 10 to be increased in size or used in smaller cockpits.

Figure 2:
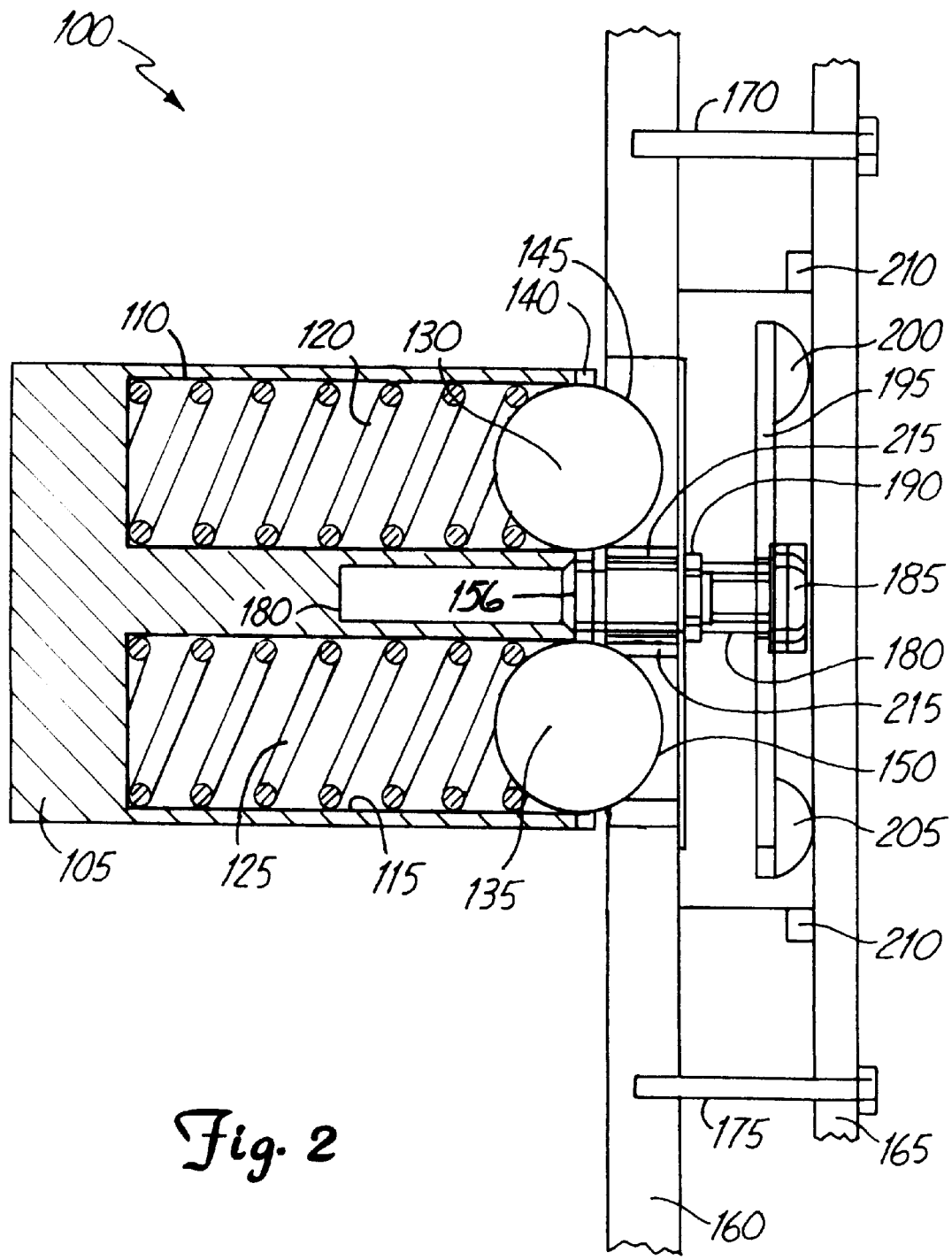
FIG. 2 is a diagrammatic side view illustrating a low profile surface mount switch and knob in accordance with preferred embodiments of the present invention which can be used in combination with LCDs to save avionics panel space.
Figure 3:
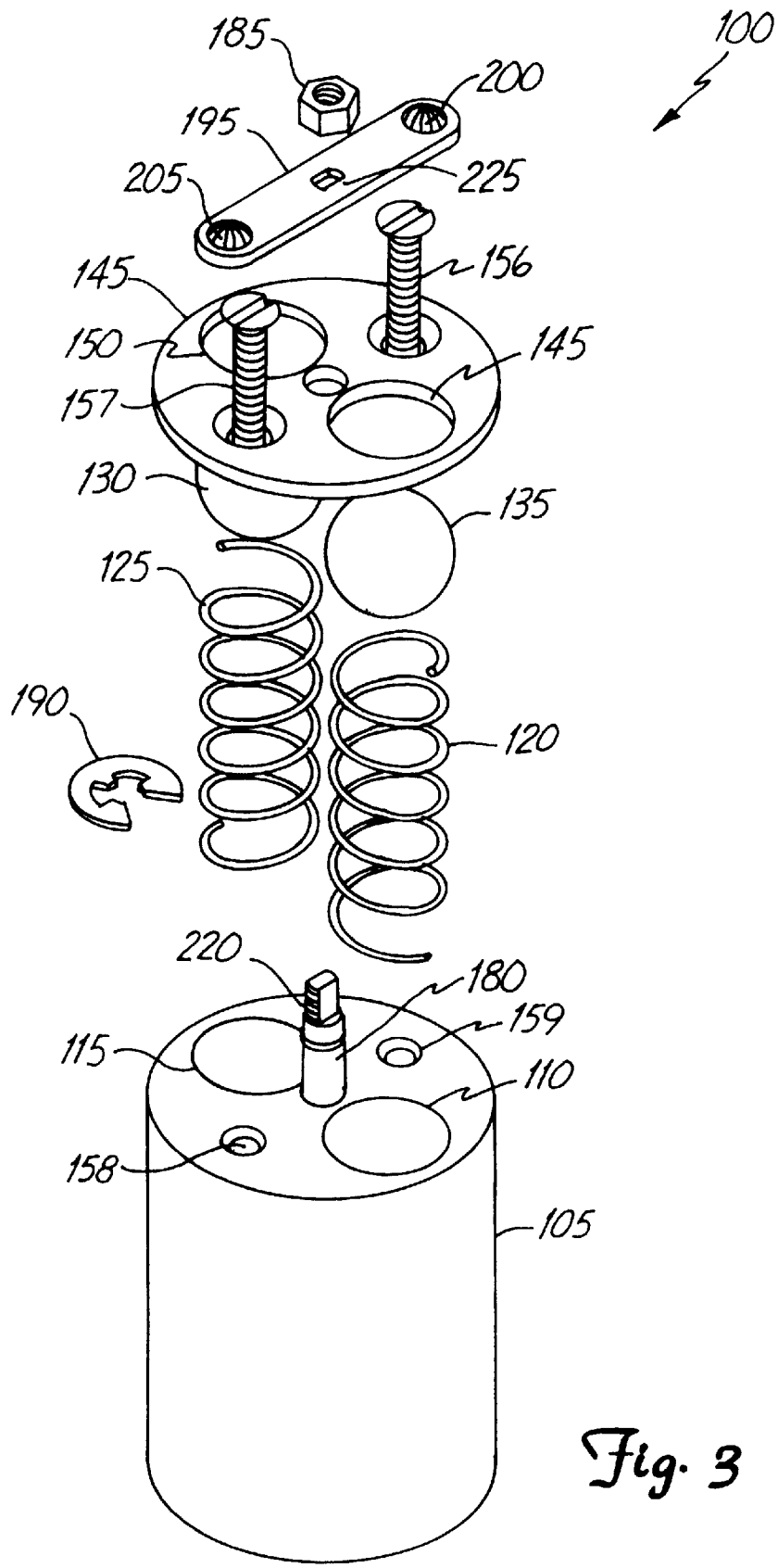
FIG. 3 is a diagrammatic exploded view of portions of the low profile surface mount switch and knob illustrated in FIG. 1.

As illustrated in FIGS. 2 and 3, low profile surface mount switch 100 includes knob 105, spring receiving cavities 110 and 115, springs 120 and 125, ball bearings 130 and 135, retaining plate 140, fasteners 156, switch panel housing 160, recesses 145 and 150 machined into switch panel housing 160, PCB 165, fastening mechanisms 170 and 175 for attaching PCB 165 to panel housing 160, threaded shaft 180 about which knob 105 rotates, fastener 185, retaining clip 190, rotating contact member 195 having contacts 200 and 205, annular gasket 210 and annular gasket 215. In preferred embodiments, bezel 13 of avionics display device 10 serves as switch panel housing 160.

Knob 105 includes cavities 110 and 115 in which springs 120 and 125 are positioned, respectively. The detent force of the switch is provided by springs 120 and 125 pressing against ball bearings 130 and 135, respectively. Ball bearings 130 and 135 rest in ball end holes 145 and 150 machined into switch panel housing 160. Ball end holes or recesses 145 and 150 align with the respective switch positions. Retaining plate 140 is fastened by fasteners 156 to knob body 105 to keep ball bearings 130 and 135 in place during assembly and operation. Retaining clip 190 is positioned about shaft 180 to captivate knob 105 the switch panel housing 160. The shaft 180 is part of an extension of knob 105. Rotating contact member 195 includes contacts 200 and 205 which make electrical contact with pads on PCB 165. PCB 165 can be a PCB used with push buttons or other electronic actuation devices typically found on bezel 13. Rotating contact member 195 is mounted on shaft 180 and is secured to shaft 180 by fastener 185 such that rotation of knob 105 causes rotation of contact member 195 and contacts 200 and 205 relative to PCB 165. Shaft 180 preferably has a flat side to orient the contact member 195 with knob 105 and to prevent the contact member from slipping when the knob is rotated. PCB 165 is attached to switch panel housing 160 via fastening mechanisms 170 and 175 which can be threaded fastening members. PCB 165 slightly compresses contact member 195 by applying a force on member 195 toward knob 105. This slight compression creates a force to maintain electrical contact between contacts 200 and 205 with pads on PCB 165. In preferred embodiments contacts 200 and 205, as well as the pads (illustrated in FIG. 4) on PCB 165 include gold or nickel plating to ensure long life.

To prevent moisture from contaminating contacts 200 and 205 and the pads on PCB 165, a gasket 210 is included between PCB 165 and the housing around the switch cut out. Likewise, a second gasket 215 is included to seal around shaft 180 where it passes through retaining plate 152. Preferably, gaskets 210 and 215 are annular gaskets. In the alternative, gaskets 210 and 215 can be combined into one molded boot to form a more complete seal. The design of knob 100 can be easily modified to accommodate different throw angles and different numbers of switch positions.

Assembly of switch 100 can be as follows. First, springs 120 and 125 are inserted into cavities 110 and 115. Next, ball bearings 130 and 135 are partially inserted into cavities 110 and 115. Ball bearings 130 and 135 are then held in this position, which compresses springs 120 and 125, by retaining plate 140. Next, shaft 180 of knob 105 is placed into switch panel housing 160 and held flush while retaining clip 190 is attached on the underside. Contact member 195 is then attached to the end of shaft 180 using fastener 185. Finally, PCB 165 is attached to housing 160 using fasteners 170 and 175. After being assembled to the switch panel housing 160, knob 105 remains captive to the housing. In previous switch designs, knob 105 is captive to circuit board 165.

FIG. 3 further illustrates additional features of low profile surface mount switch 100. For example, as can be seen in FIG. 3, shaft 180 includes shaped end 220 which is adapted to the shape of shaped aperture 225 in contact member 195. The non-circular shaped end 220 and aperture 225 assure that contact member 195 will rotate without slipping when knob 105 is rotated. Further, as can be seen in FIG. 3, retaining plate 140 can be at least partially held in position against ball bearings 130 and 135 via threaded fasteners 156 and 157 which are adapted for mating with threaded apertures 158 and 159 formed within knob 105.

Although not specifically shown in the FIGS., low profile surface mount switch 100 also includes a mechanism for limiting the angular rotation of the switch. Stop mechanisms of this type, which can include for example protruding shafts adapted to travel in milled tracks, are commonly used in switches to prevent the switch from rotating into positions with no corresponding electrical pads. This type of mechanism can also be adjustable to allow for multiple limiting degrees of rotation.

Figure 4:
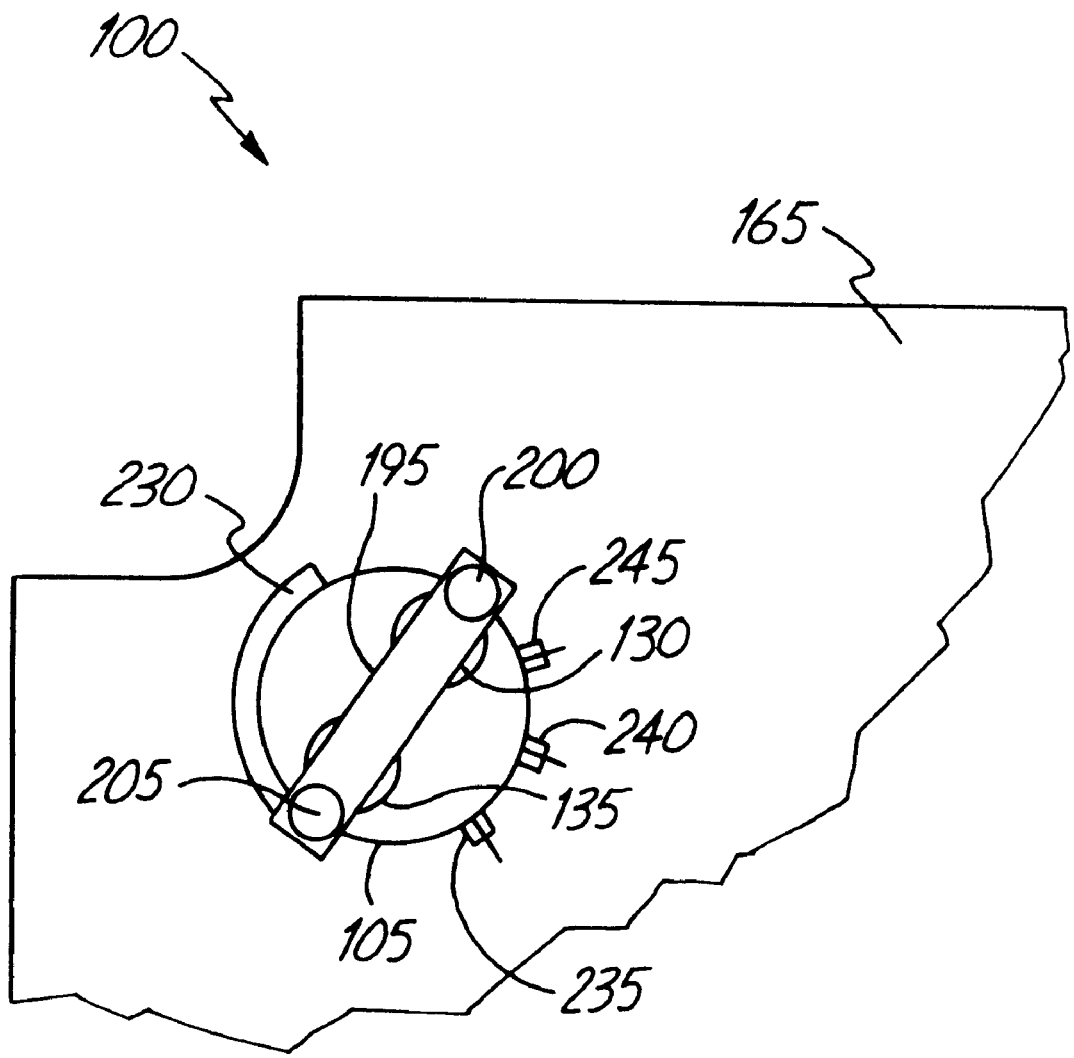
FIG. 4 is a diagrammatic top view of the low profile surface mount switch and knob of the present invention which further illustrates the pads on the printed circuit board corresponding to various switch positions.

FIG. 4 illustrates a front view of low profile surface mount switch 100 relative to PCB 165 located beneath bezel 13 of avionics display device 10. As can be seen in the embodiment illustrated in FIG. 4, PCB 165 includes ground pad 230, first pad 235 corresponding to a first switch position, second pad 240 corresponding to a second switch position and third pad 245 corresponding to a third switch position. Electrical contact 205 is in electrical contact with ground pad 230 on PCB 165 regardless of which of the first, second and third switch positions surface mount switch 100 is in. As illustrated, switch 100 is in a fourth or off position. Rotation of knob 105 causes contact 200 to move into electrical contact with a desired one of pads 235, 240 and 245. Ball bearings 130 and 135 are illustrated in FIG. 4 for their roll in allowing rotation of knob 105 relative to PCB 165. However, ball bearings 130 and 135 are not likely to actually be visible in this view.

By placing the detent mechanism within the knob, a low profile switch which can be positioned in the limited bezel space of an LCD is achieved. The inclusion of a rotatable type switch, which are frequently preferred by pilots, without consuming additional avionics panel space within the cockpit of an aircraft is highly advantageous.

Although the present invention has been described with reference to preferred embodiments, workers skilled in the art will recognize that changes may be made in form and detail without departing from the spirit and scope of the invention.

What is claimed is:

1. An avionics display device adapted for insertion into an avionics panel of an aircraft, the avionics display device comprising:

a liquid crystal display having a liquid crystal display element and a bezel surrounding the liquid crystal display element; and a low profile rotary switch mounted on the bezel of the liquid crystal display, wherein the rotary switch comprises:

a printed circuit board positioned beneath the bezel, the printed circuit board having a plurality of electrical pads formed thereon;

a contact member positioned adjacent to the printed circuit board, the contact member having a first contact formed thereon, wherein rotation of the contact member causes the first contact to be electrically coupled to one of the plurality of electrical pads formed on the printed circuit board;

a knob coupled to the contact member such that rotation of the knob causes rotation of the contact member; and a detent mechanism positioned in the knob and providing a detent force which maintains the contact member in its position adjacent the printed circuit board.

2. The avionics display device of claim 1, wherein the knob is coupled to the contact member by a shaft such that rotation of the knob causes rotation of the contact member.

3. The avionics display device of claim 2, and further comprising a retaining clip positioned on the shaft to rotatably secure the knob to a switch panel housing.

4. The avionics display device of claim 3, wherein the switch panel housing is fixedly secured to the printed circuit board to thereby rotatably secure the knob to the printed circuit board.

5. The avionics display device of claim 4, wherein the detent mechanism positioned in the knob further comprises:

a first cavity formed in the knob; and a first detent force generating mechanism positioned within the cavity and providing at least a portion of the detent force to maintain the contact member in its position adjacent the printed circuit board.

6. The avionics display device of claim 5, wherein the first detent force generating mechanism positioned within the first cavity is a first spring.

7. The avionics display device of claim 6, wherein the detent mechanism further comprises:

a second cavity formed in the knob; and a second spring positioned within the cavity and providing at least a portion of the detent force to maintain the contact member in its position adjacent the printed circuit board.

8. The avionics display device of claim 7, wherein the detent mechanism further comprises:

a first ball bearing positioned at least partially within the first cavity in contact with the switch panel housing and in contact with and compressing the first spring such that the first spring provides a portion of the detent force; and a second ball bearing positioned at least partially within the second cavity in contact with the switch panel housing and in contact with and compressing the second spring such that the second spring provides a portion of the detent force.

9. An avionics display device adapted for insertion into the cockpit of an aircraft, the avionics display device comprising:

a liquid crystal display having a liquid crystal display element and a panel surrounding the liquid crystal display element; and low profile rotary switch mounted on the panel of the liquid crystal display for controlling information displayed by the liquid crystal display, the low profile rotary switch comprising:

a printed circuit board positioned beneath the panel, the printed circuit board having a plurality of electrical pads formed thereon;

a contact member positioned adjacent to the printed circuit board, the contact member having a first contact formed thereon, wherein rotation of the contact member causes the first contact to be electrically coupled to one of the plurality of electrical pads formed on the printed circuit board;

a knob coupled to the contact member such that rotation of the knob causes rotation of the contact member; and a detent mechanism positioned in the knob and providing a detent force which maintains the contact member in its position adjacent the printed circuit board.

10. The avionics display device of claim 9, wherein the knob is coupled to the contact member by a shaft such that rotation of the knob causes rotation of the contact member.

11. The avionics display device of claim 10, and further comprising a retaining clip positioned on the shaft to rotatably secure the knob to the panel of the panel of the liquid crystal display.

12. The avionics display device of claim 11, wherein the panel is fixedly secured to the printed circuit board to thereby rotatably secure the knob to the printed circuit board.

13. The avionics display device of claim 12, wherein the detent mechanism positioned in the knob further comprises:

a first cavity formed in the knob; and a first detent force generating mechanism positioned within the cavity and providing at least a portion of the detent force to maintain the contact member in its position adjacent the printed circuit board.

14. The avionics display device of claim 13, wherein the first detent force generating mechanism positioned within the first cavity is a first spring.

15. The avionics display device of claim 14, wherein the detent mechanism further comprises:

a second cavity formed in the knob; and a second spring positioned within the cavity and providing at least a portion of the detent force to maintain the contact member in its position adjacent the printed circuit board.

16. The avionics display device of claim 15, wherein the detent mechanism further comprises:

a first ball bearing positioned at least partially within the first cavity in contact with the panel of the liquid crystal display and in contact with and compressing the first spring such that the first spring provides a portion of the detent force; and a second ball bearing positioned at least partially within the second cavity in contact with the panel of the liquid crystal display and in contact with and compressing the second spring such that the second spring provides a portion of the detent force.

* * * * *